United States Patent [19]
De Freese et al.

[11] Patent Number: 5,564,025
[45] Date of Patent: Oct. 8, 1996

[54] APPARATUS FOR ARBITRATING REQUESTS FOR ACCESS FROM SLAVE UNITS BY ASSOCIATING THE REQUESTS WITH MASTER UNITS AND DETERMINING THE RELATIVE PENDENCY THEREOF IN A RADIO BASE STATION TRANSCEIVER

[75] Inventors: Karsten De Freese; Rudolf Brückel, both of Nürnberg, both of Germany

[73] Assignee: U.S. Philips Corporation, New York, N.Y.

[21] Appl. No.: 389,443

[22] Filed: Feb. 15, 1995

Related U.S. Application Data

[63] Continuation of Ser. No. 91,639, Jul. 14, 1993, abandoned.

[30] Foreign Application Priority Data

Aug. 10, 1992 [EP] European Pat. Off. .............. 92202456

[51] Int. Cl.$^6$ .................................................. G06F 13/36
[52] U.S. Cl. ................. 395/290; 395/860; 395/303; 340/825.06; 364/DIG. 1; 364/230.4; 364/242.8; 364/242.92
[58] Field of Search .................... 340/825.06, 823.07, 340/825.08, 825.09, 825.1, 825.11, 825.12, 825.13, 825.52; 364/132, 514; 395/200.05, 200.06, 860, 861, 864, 866, 287, 289, 290, 293, 296, 298, 800; 370/57, 58.1, 58.2, 9.1, 76–77, 95.3; 455/49.1, 53.1, 56.1, 73; 375/219; 379/58–60

[56] References Cited

U.S. PATENT DOCUMENTS

| 3,333,252 | 7/1967 | Shimaburuno | 340/172.5 |
|---|---|---|---|
| 3,806,885 | 4/1974 | Moore | 395/289 |
| 3,912,875 | 10/1975 | Katz | 379/61 |
| 4,145,739 | 3/1979 | Dunning et al. | 395/289 |
| 4,247,908 | 1/1981 | Lockhart, Jr. et al. | 395/200.01 |
| 4,396,984 | 8/1983 | Videki, II | 395/858 |
| 4,414,661 | 11/1983 | Karlstrom | 370/95 |
| 4,467,418 | 8/1984 | Quinquis | 395/299 |
| 4,495,573 | 1/1985 | Ballegeer et al. | 395/290 |
| 4,686,474 | 8/1987 | Olsen et al. | 324/331 |
| 4,727,475 | 2/1988 | Kiremidjian | 395/284 |

(List continued on next page.)

FOREIGN PATENT DOCUMENTS

| 0278264 | 8/1988 | European Pat. Off. . |
|---|---|---|
| 0439926 | 8/1991 | European Pat. Off. . |

OTHER PUBLICATIONS

P. Reljonen, "GSM Base Station Development", Telecommunication, Sep. 1990, pp. 85–92.
T. L. Harman & B. Lawson, "The Motorola MC68000 Microprocessor Family: Assembly Language Interface Design, and System Design", Prentice Hall, 1985, pp. 352–366. DCRC Conference, Oct. 12–24, 1988.
B. J. T. Mallinder, "An Overview of the GSM System", DCRC conference, Oct. 12–24, 1988, pp. 1a/1–13.
H. Ochsner, "Overview of the Radio Subsystem", DCRC Conference, Oct. 12–24, 1988, pp. 3a/1–12.

Primary Examiner—Lance L. Barry
Attorney, Agent, or Firm—Leroy Eason

[57] ABSTRACT

The radio base station (BSI) in a cellular radio communication system such as a GSM system must perform considerable real time processing, e.g. for channel coding and decoding, which requires a considerable number of processors (SC01, SC02, OC0). For optimal deployment of the processors and to facilitate extensions and modifications of the system, the radio base station (BS1) has an internal arbitration bus (IPB) for coupling master and slave control units and signal processing units to the processors and to channel coders (CHC1, CHC2, CHC3, CHC4) or other resources. A master and slave arbitration system is thereby achieved wherein requests from master and slave units can be queued flexibly, and in which optimal use is made of available resources. By using a RAM table for assigning master and slave units to each other, further flexibility in use of resources is achieved. Adaptive polling of requesting units may be employed in order to increase system throughput.

10 Claims, 6 Drawing Sheets

U.S. PATENT DOCUMENTS

| | | | |
|---|---|---|---|
| 4,794,516 | 12/1988 | Auerbach et al. | 395/294 |
| 4,817,037 | 3/1989 | Hoffman et al. | 395/290 |
| 4,825,438 | 4/1989 | Bennett et al. | 371/8 |
| 4,888,684 | 12/1989 | Lilja et al. | 395/289 |
| 4,912,705 | 3/1990 | Paneth et al. | 370/95.1 |
| 4,953,197 | 8/1990 | Kaewell, Jr. et al. | 379/58 |
| 4,969,120 | 11/1990 | Azevedo et al. | 395/297 |
| 4,979,100 | 12/1990 | Makris et al. | 395/297 |
| 4,987,529 | 1/1991 | Craft et al. | 395/293 |
| 5,029,183 | 7/1991 | Tymes | 375/1 |
| 5,134,709 | 7/1992 | Bi et al. | 455/33.1 |
| 5,140,680 | 8/1992 | Best | 395/290 |
| 5,204,669 | 4/1993 | Dorfe et al. | 340/825.52 |

ARBITRATION
IDENTIFICATION CODE

| 0 | 1 | 2 | 3 | 4 | 5 | 6 | 7 |
|---|---|---|---|---|---|---|---|
| X | X | X | X | X | X | X | X |

ASSIGNMENT TABLE

| REQUESTING UNIT | ASSIGNED MASTER |
|---|---|
| M1 | M1 |
| M2 | M2 |
| M3 | M3 |
| S1 | M1 |
| S2 | M1 |
| S3 | M3 |

APPARATUS FOR ARBITRATING REQUESTS FOR ACCESS FROM SLAVE UNITS BY ASSOCIATING THE REQUESTS WITH MASTER UNITS AND DETERMINING THE RELATIVE PENDENCY THEREOF IN A RADIO BASE STATION TRANSCEIVER

This is a continuation of application Ser. No. 08/091,639, filed Jul. 14, 1993, now abandoned.

BACKGROUND OF THE INVENTION

1. Field of the Invention

The present invention relates to a radio communication system comprising at least one radio base station for communicating with a plurality of mobile radio stations, the base station comprising control and signal processing means.

The invention more particularly relates to a radio base station for use in a cellular radio digital communication system, which base station comprises control and signal processing means.

SUMMARY OF THE INVENTION

2. Description of the Related Art

A radio communication system and a radio base station of this kind are known from the article, "GSM Base Station Development", P. Reljonen, Telecommunications, September 1990, pp. 85–92. In this article GSM Base Systems are described, consisting of a number of cells with one Base Transceiver Station (BTS) in each cell, each BTS having a number of radio carriers (TRX). By using time-division techniques, each carrier is capable of serving eight physical channels. In GSM, the frequency band used is 935–960 MHz (TX) and 890–915 MHz (Rx). The total number of different carriers then becomes 124, given the carrier separation of 200 kHz. The Base System communicates with Mobile Radio Stations roaming in the cells. BTS intelligence is partly centralized towards a switching center called the Base Station Controller (BSC), which as part of the Base Station System manages and maps both radio and terrestrial channels, and executes handovers. Functions included in the BTS are channel encoding and decoding (CHC), interleaving, encryption, TDMA frame building, modulation and demodulation, RF transceiving, and RF antenna diversity reception. In a physical realisation a BTS rack may comprise twelve Radio Terminals, in two rack mounting frames containing three double Radio Terminals each, i.e. 96 channels are provided at each site. Such a rack further may comprise antenna coupling equipment, a rack interface and power supply units. For carrying out said functions in the BTS, the Radio Terminals comprise control and signal processing means which are not disclosed in detail in said article. In order to meet real time requirements for various control and signal processing functions, such as channel encoding and decoding etc., the radio terminals usually comprise a number of processors for various tasks.

It is an object of the present invention to provide a cellular radio digital communication system in which processors for carrying out control and signal processing functions are deployed optimally and further that the system can be extended or modified easily.

To this end a base station of a cellular radio digital communication system according to the present invention is characterised in that the control and signal processing functions are carried out by data processors some of which are master units and others of which are slave units which operate under the control of master units. The base station also comprises an internal bus coupled to the master and slave units, and further a processor which operates as an arbiter unit coupled to the internal bus for arbitrating access to the internal bus by the masters and the slaves. It is achieved that any master, all of the processors potentially being master, can access any slave, e.g. a channel encoding and decoding unit or channnel codec, or any other processor randomly. It is also achieved that the system can be extended with further masters or slaves easily, simply by adding these masters and slaves to the internal bus and by modifying the control software slightly.

It is to be mentioned that systems for resolving access conflicts to a common bus are known per se in a general data processing environment, but these systems lack flexibility to be extended or modified.

For example, U.S. Pat. No. 4,467,418 describes a multiprocessor system connected to a single line arbitration bus in which arbitration takes place on the basis of variable length pulses applied to bus requesters on the arbitration bus for marking the same. The requesters draw pulses of randomly distributed durations and the requester or allocator with the longest temporisation wins the arbitration process.

Also, in the handbook, "The Motorola MC68000 Microprocessor Family: Assembly Language, Interface Design, and System Design", T. L. Harman et at., Prentice-Hall, 1985, pages 352–366, a bus master and slave arbitration is disclosed per se, whereby external bus requesting devices, such as DMA (direct memory access) circuits, are coupled to a bus, together with an MC68000 Microprocessor being a bus master. There, bus arbitration, as an alternative of asserting the so-called not-HALT signal line of the processor, avoids conflicts between the MC68000 Microprocessor and external devices, such as memories, accessing the bus are avoided by use of the MC68000's bus arbitration logic. The bus arbitration feature of the MC68000 allows another device to request use of the bus. Asserting the so-called Bus Request signal will force the processor to assert the so-called Bus Grant signal after it completes its current bus cycle. Once the requesting device is in control, the so-called Bus Grant Acknowledge signal is held low and the bus is used by the device as necessary. When the operations are complete, the device negates the Bus Grant Acknowledge signal and the MC68000 resumese control of the bus. If a number of external devices can request control of the bus and each acts as master, external circuitry must be provided to determine their priority. In fact this bus access by external devices is a form of cycle stealing from the processor, the MC68000.

In an embodiment of a base station according to the present invention masters and/or slaves can be requesters, and masters are assignable to requesters, the arbitrating comprising the steps of examining requesters for having a pending request, of activating a master assigned to the requester having the pending request, and of servicing the request. In this way a flexible routing of service requests is achieved, and it is avoided that much of the bus capacity is wasted by processors polling all slaves, i.e. if a slave has data for a processor, it must be able to request servicing from that processor.

In a further embodiment of a base station according to the present invention the examining of requesters comprises cyclic polling of the requesters by the arbiter until the pending request is found. In this way no requesters are missed.

In a further embodiment of a base station according to the present invention the polling is based upon an adaptive priority scheme. In this way certain requesters can be favoured above others, or the number of polled addresses on the internal bus can be adapted to the number of bus participants which are able to make requests.

In an embodiment of a base station according to the present invention the requesters have a unique arbitration identification code for identifying themselves to the arbiter. It is thus achieved that the arbiter can easily carry out a polling scheme, simply by putting arbitration identification codes on an address bus comprised in the internal bus. If a requester has a pending request and its arbitration identification code appears on the address bus, it asserts a common request acknowledge signal, which signals the request to the arbiter. In an adaptive polling scheme a RAM-table (Random Access Memory) can be used containing arbitration identification codes of existing requesters only, the latter improving system throughput. The RAM-table can have multiple entries for certain requesters, thus controlling priority.

In a further embodiment of a base station according to the present invention the identification code is at least partially determined by a board address of a board on which the requester is located, the board address being dependent on its physical location in a slot in a system mounting frame. In this way the number and the type of boards actually connected can be changed, and the boards can be freely distributed over the available system slots. By making the address dependent on the physical location in the system slot, address collisions or manual configuration of address ranges are avoided.

In an embodiment of a base station according to the present invention the base station comprises an assignment table for assigning masters to other masters and/or slaves, and wherein the arbitration identifying code of a requester is taken as a pointer to the assignment table for carrying out a request from a master or slave from a pointed table entry. In this way a very flexible system operation is achieved in which any arbitration scheme can be set up. The assignment table can be build up in a dual-ported RAM for easy updating by an initialising processor.

In an embodiment of a base station according to the present invention a master which has gained access to the internal bus is allowed to use the bus for data transfer until a predetermined time has elapsed after gaining access. In this way the internal bus can be arbitrated on the basis of variable length time slots, i.e. each master, once having gained bus mastership, may use the bus as long as it needs it up to a maximum bus allocation time, so that it is avoided that faulty masters can block the internal bus. The address of a faulty master can be stored for system controlling and monitoring purposes. A typical value of the predetermined time is 1 msec.

BRIEF DESCRIPTION OF THE DRAWINGS

The present invention will now be described, by way of example, with reference to the accompanying drawings, wherein FIG. 1 schematically shows a cellular radio communication system.

DESCRIPTION OF THE PREFERRED EMBODIMENTS

Figure 1:
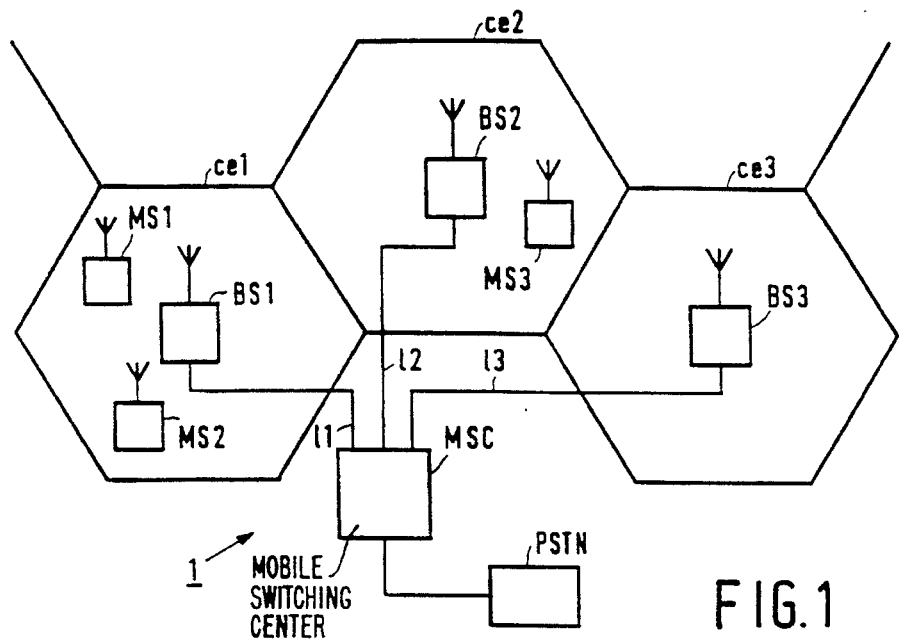

FIG. 1 schematically shows a radio communication system 1, for example a cellular system like a GSM (Groupe Special Mobile) system as defined by ETSI (European Telecommunications Standards Institute), comprising in cells ce1, ce2 and ce3 radio base stations BS1, BS2 and BS3, in principle for covering radio communication in the respective cells ce1, ce2 and ce3. In order not to cause interference with neighbouring cells the radio base stations, at least in adjacent cells, transmit and receive at different frequencies, usually each radio base station BS1, BS2 and BS3 transmitting and receiving at a number of frequencies, e.g. twelve frequency channels. By applying time division multiplex, such as TDMA, in GSM with eight time slots per frequency channel, 96 logical channels are available for radio comunication per base station. The radio base stations BS1, BS2 and BS3 communicate with mobile radio stations MS1, MS2 and MS3 in their respective cells, in the given example the radio base station BS1 communicating with the mobile stations MS1 and MS2, and the radio base station BS2 communicating with the mobile station MS3. When mobile radio stations roam through the cells ce1, ce2 and ce3 a so-called handover from one radio base station to another should occur if the quality of the communication link deteriorates, a system control function being carried out by a Mobile Switching Centre MSC, which is connected to the radio base stations BS1, BS2 and BS3 by means of landlines 11, 12 and 13 respectively. The MSC is connected to a Public Switched Telephone Network PSTN, in case of Public Mobile Radio. For Private Mobile Radio, such connection can be omitted. Furthermore, in a GSM system, to protect the data from transmission errors on the radio path, among other operations, channel coding is applied on the logical channels before transmission and channel decoding at reception, i.e. a lot of (quasi) real time processing is required on data to be transmitted. To this end, and for other processing tasks, the radio base stations comprise a number of processors, a so-called processor pool, and a number of channel codecs, channel encoders and decoders, to be described later on. For a more detailed description of a cellular system, e.g. GSM, referred is to said article by Reljonen, and further to the articles "An Overview of the GSM System", B. J. T. Mallinder, and "Overview of the Radio Subsystem", H. Ochsner, Conference Proceedings of the Digital Cellular Radio Conference DCRC, Oct. 12–24, 1988, Hagen, Westfalia, FRG, pages 1a/1–1a/13, and pages 3a/1–3a/12, respectively.

Figure 2:
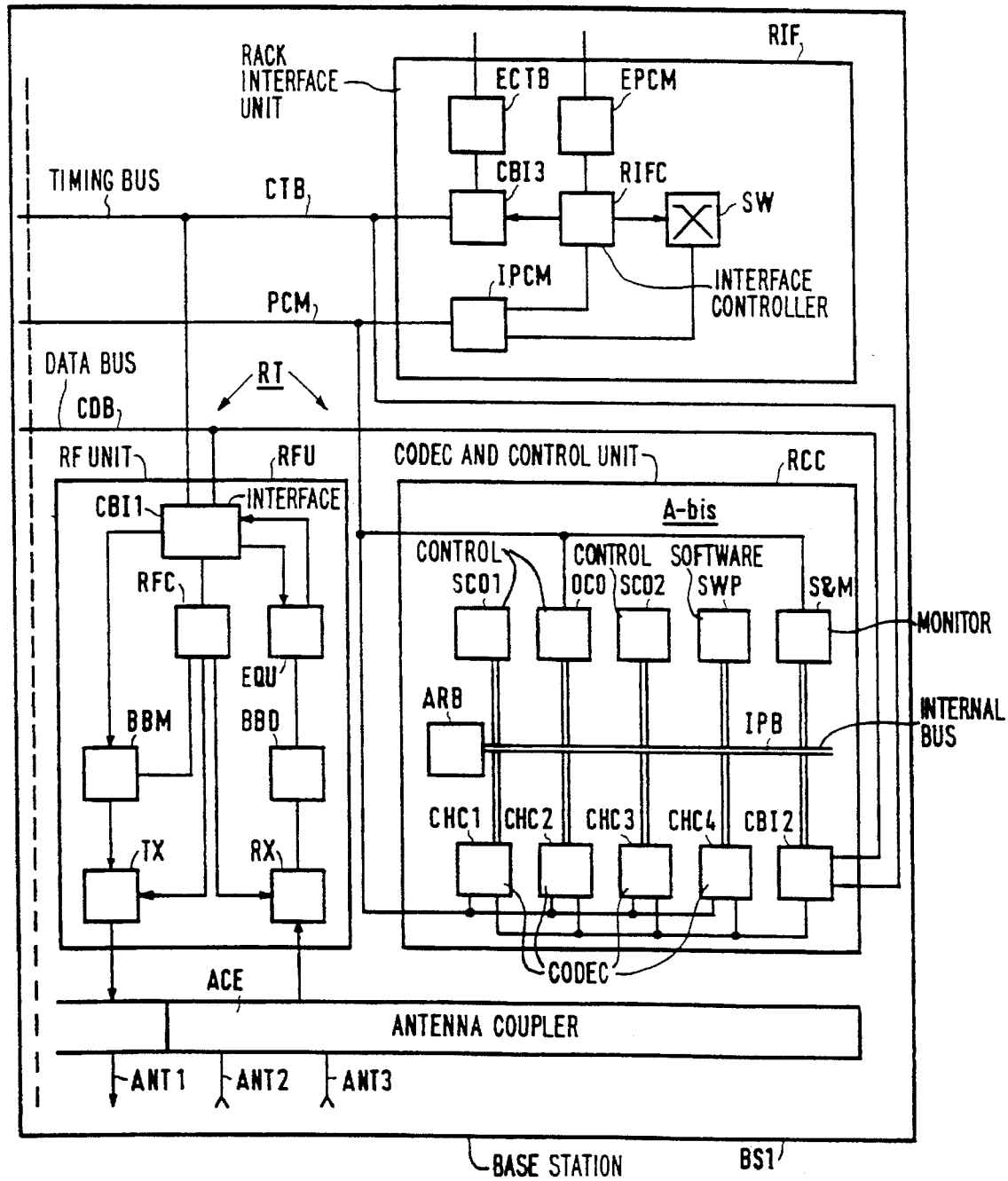
FIG. 2 is a blockdiagram of a radio base station for use in a cellular radio communication system.

FIG. 2 is a blockdiagram of a radio base station BS1 according to the present invention, for use in the radio communication system 1. The radio base station BS1 comprises a number of radio terminals, half of a double one, radio terminal RT being shown. The radio base station BS1 may comprise twelve radio terminals in a rack of two rack mounting frames of a radio base station rack, here not further shown. The radio terminal RT comprises an RF-unit RFU and a radio codec and control unit RCC which can exchange data with each other via a cluster data bus CDB. The units RFU and RCC are coupled to a rack interface unit RIF via a cluster timing bus CTB, and the unit RCC is further coupled to the unit RIF via a PCM-link PCM of 2 Mbits/sec. The rack interface unit RIF comprises several interfaces for coupling to other radio terminals inter alia, such as an external cluster timing bus interface ECTB, and an interface for connection to external PCM-hardware EPCM, and further internal PCM-hardware IPCM coupled to a rack interface controller RIFC and a switch SW. The switch SW is coupled to further external circuitry, not shown here. The purpose of showing the above units in the rack interface unit is to show that the radio terminal RT, to be described further, is connected to other hardware in the radio base station BS1 for exchanging data, and further to indicate that in a digital radio communication, like GSM, data to be transmitted or received are PCM encoded data. For mutual timing and data exchange the RF-unit RFU, the radio codec and control Unit RCC, and the rack interface unit RIF comprise a cluster bus interface CBI1, CBI2, and CBI3, respectively, coupled to the cluster timing bus CTB and to the cluster data bus CDB.

More in detail the RF-unit RFU comprises an RF-controller RFC which is coupled to the cluster bus interface CBI1. For PCM-data to be transmitted, the cluster bus interface CBI1 is coupled to a transmitter radio part TX, via a base band modulator BBM, both being controlled by the RF-controller RFC. Received encoded radio signals are fed to a base band digitizer BBD, via a receiver radio part RX, which is controlled by the RF-controller RFC. Received and digitized signals are fed to the cluster bus interface CBI1 after equalization by means of an equalizer EQU. The transmitter and receiver radio parts TX and RX are coupled to an antenna or to antennas ANT1, ANT2 and ANT3 via antenna coupling equipement ACE. For reception a plurality of antennas can be used together with a number of receiver radio parts, in order to achieve antenna diversity.

The radio codec and control unit RCC comprises a number of processors, e.g. signalling controllers SCO1 and SCO2, and an operations and maintenance controller OCO, and further a software pool SWP, and a simulator/monitor S&M, all coupled to an internal bus IPB. Further coupled to the internal bus IPB are a number of channel codecs, CHC1, CHC2, CHC3, and CHC4, the cluster bus interface CBI2, and an arbiter ARB. The internal processor bus IPB is further coupled to a second radio codec and control unit in the radio terminal RT, not further shown here. The operations and maintenance controller OCO carries out more dedicated tasks than the other processors, and is therefore coupled to the PCM-link PCM for communicating to other system parts. The simulator/monitor is also coupled to the PCM-link PCM. In GSM the latter coupling in the base station BS1 is at the GSM-defined A-bis interface level, see for further details the cited Mallinder reference, page 1a/2. Also, the channel codecs CHC1, CHC2, CHC3, and CHC4 are coupled to the PCM-link PCM. In the given example units connected to the internal bus IPB can be divided by their data transfer capabilities into two classes, masters and slaves. E.g. the processors OCO, SCO1, and SCO2 can be masters, and the channel codecs CHC1, CHC2, CHC3, and CHC4 can be slaves. Masters are able to control the internal processor bus IPB, i.e. masters can initiate a data transfer cycle, either read or write, and they can generate control signals. Only one master can be active at a time, and then is an active master. Masters which are not currently active are potential masters. Slaves are passive systems, which can only be active when a master accesses them. A task of the arbiter ARB is to give bus control to one of the potential masters, every master being able to request bus control of the internal bus IPB. Slaves cannot directly request bus control, but they may issue a service request to the arbiter. Such slaves are requesting slaves. Masters and requesting slaves are requesters, and requesters which are currently issuing a request are active requesters. If there is no active master, the internal bus is idle. Though the arbiter ARB is shown as a separate unit in FIG. 2, the arbiter ARB may be integrated with a master, which then can perform both arbiter and master functions.

Figure 3:
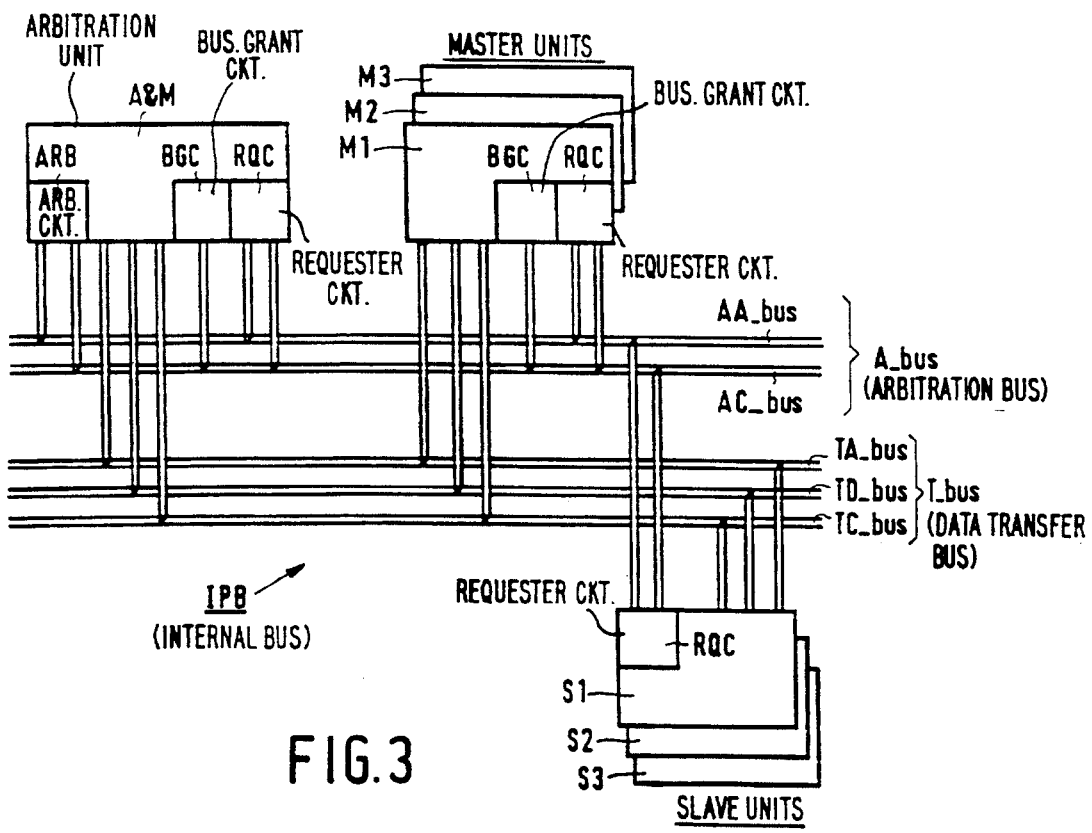
FIG. 3 is a processor bus architecture for use in a radio base station, FIGS. 4A, B and C show bus arbitration situations in a processor bus architecture

FIG. 3 shows a detailed processor bus architecture for the internal bus IPB, in the radio base station BS1. With the help of this more detailed architecture, and with the help of FIGS. 4 and 5, the functioning of the internal bus IPB as an arbitration bus will be described. Shown is an arbiter and master A&M, a number of masters M1, M2, and M3, and a number of requesting slaves S1, S2, and S3, all coupled to the internal processor bus IPB. The internal bus IPB can logically and physically be divided into two independent functions, arbitration and data transfer. To this end the bus IPB comprises an arbitration bus A_bus having an arbitration address bus AA_bus and an arbitration control bus AC_bus, and a transfer bus T_bus, having an transfer address bus TA_bus, a transfer data bus TD_bus, and a transfer control bus TC_bus. The bus widths may be 8 bits for the AA_bus, 4 bits for the AC_bus, 13 bits for the TA_bus, 8 bits for the TD_bus, and 3 bits for the TC_bus. The arbiter and master A&M comprises an arbiter circuit ARB coupled to the AA_bus and to the AC_bus, the masters M1, M2, and M3 comprise a bus grant circuit BGC coupled to the AC_bus, and the slaves S1, S2, and S3 comprise a requester circuit RQC coupled to the AA_bus and to the AC_bus. Furthermore, the arbiter and master A&M, the masters M1, M2, and M3, and the slaves S1, S2, and S3 are coupled to the TA_bus, TD_bus, and TC_bus. The function of the arbitration is to share the internal bus IPB between the potential masters and to route requests from slaves to masters. While the bus is idle, the arbiter performs cyclic tests for requests from masters or slaves. If a master M1, M2, or M3 has issued a request, it gets alarmed as soon as the arbiter ARB allocates the internal bus IPB to it. If a slave S1, S2, or S3 has issued a request, a master M1, M2, or M3 assigned to that slave gets alarmed. After a master has been alarmed, it may use the bus until it releases it. However, after a predetermined time or time-out, the arbiter ARB will force a faulty bus master to release the internal bus IPB. The arbitration is accomodated via the arbitration bus A$_{13}$bus. Data transfer is accomodated via the transfer bus T_bus. A handshaking mechanism allows for flexible response times, i.e. the bus is completely asynchronous.

In order to describe the arbitration mechanism, FIG. 4 shows bus arbitration situations in a processor bus architecture according to FIG. 3, as a function of time t. Shown are three arbitration situations, in FIG. 4A, FIG. 4B, and FIG. 4C, respectively, FIG. 4A showing a regular arbitration situation, FIG. 4B showing an allocation time-out situation, and FIG. 4C showing an arbitration time-out situation. In the arbitration situations the arbiter address bus AA_bus is shown, and the arbiter control bus AC_bus, comprising four control signals, /RQ_ARB, /RQ_ACK, /MA_ARB, and/ MA_ACK. The AA_bus is used to transfer requester and master addresses and is constantly driven by the arbiter. The /RQ_ARB signal is, used to signal a requester arbitration phase rph and is constantly driven by the arbiter. The /RQ_ACK signal is used by an active requester to signal its request to the arbiter, if it recognizes its own arbitration identification code during the requester arbitration phase rph and is driven by an active request. The /MA_ARB signal is used to qualify a master arbitration identification code during a master arbitration phase mph and a data transfer phase dph, and is constantly driven by the arbiter. The /MA_ACK signal is used by a master to signal that it is ready to take over bus control if it recognizes its own arbitration identification code during the master arbitration phase mph, and is driven by a master.

Figure 4A:
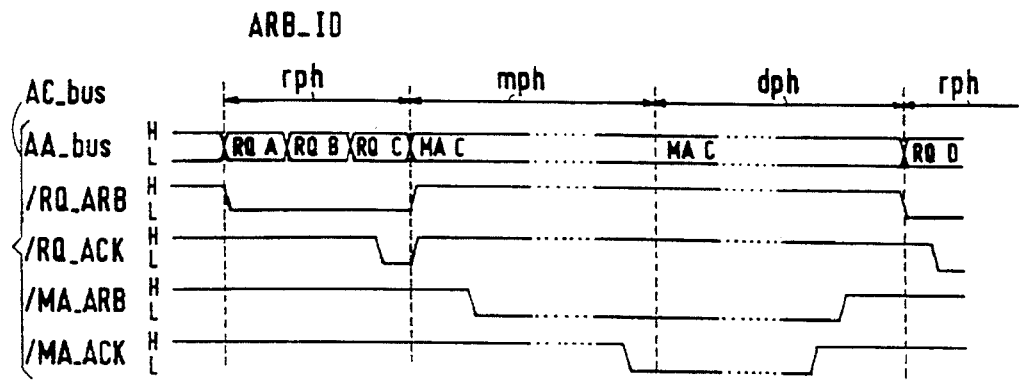
FIG. 4D shows the structure of an eight bit arbitration identification code.
Figure 4B:
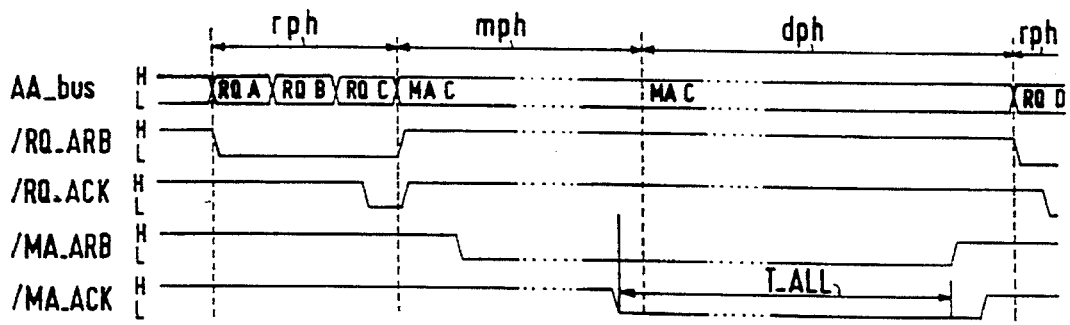
Figure 4C:
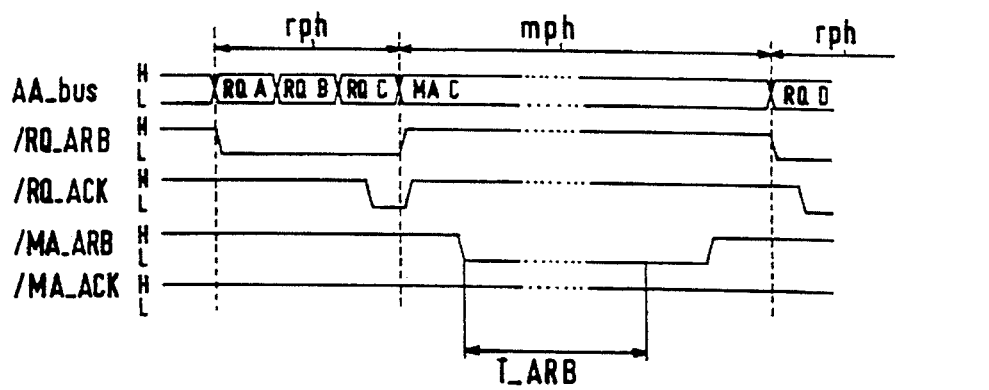
Figures 4D, 6A, 8:
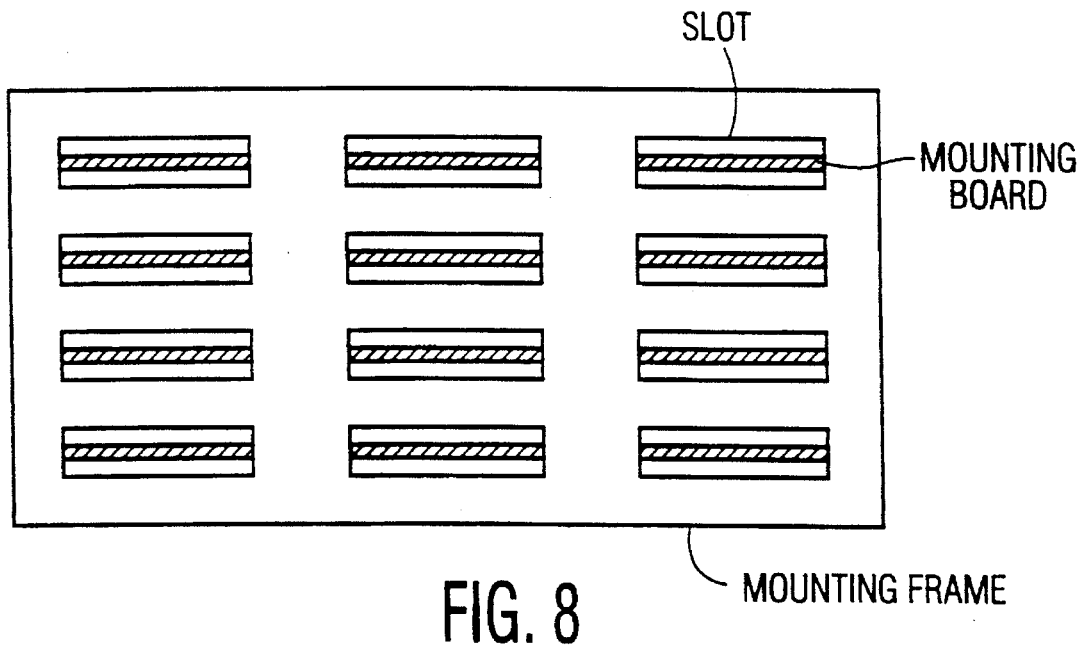
FIG. 8 shows the structure of the mounting frame of a radio base station BS.

In the requester arbitration phases rph the requesters are polled by the arbiter ARB until a pending request is found. In the master arbitration phases mph the master which is assigned to the requester having the request, will be activated. In the data transfer phases dph, the internal bus is assigned to one master and data can be transferred. During the requester arbitration and the master arbitration phases rph and mph, the transfer bus T_bus is idle. The arbitration logic consists of the arbiter circuit ARB, the requester circuits RQC, the bus grant circuits BGC and the arbitration bus A_bus comprising the busses AA_bus and AC_bus. The arbiter circuit ARB, to be described in more detail in FIG. 6, has to be configured by a processor, e.g. the processor OCO as shown in FIG. 2. For isolating faulty bus, masters from the bus inter alia, the arbitration address lines are separated from the transfer bus address lines because they have to be kept stable during the data transfer phase. Furthermore, all requesters have a unique eight bit arbitration identification code, which is derived from the physical location of the board (slot number) and a relative board number, i.e. the board address. The arbitration code is thus structured as shown in FIG. 4D, wherein each "X" is either a "1" or a "0" in the 8-bit code for each requester.

During the requester arbitration phases rph, the signal/ RQ_ARB is active, indicated by L(ow). In the give example there are four requesters, RQ A, RQ B, RQ C, and RQ D. To search for an active requester, the arbiter ARB puts arbiter identification codes ARB_ID onto the AA_bus. If a requester RQ C has a pending request and its ARB_ID appears on the AA_bus, it asserts a common request acknowledge signal/RQ_ACK, which signals the request to the arbiter ARB. Otherwise, if no requester asserts/RQ_ ACK, the arbiter ARB will drive a next ARB_ID value onto the AA_bus until/RQ_ACK is asserted by a requester RQ C. In the given example RQ C acknowledges a request. In a practical situation only a fraction of possible requesters, i.e. ARB_IDs, might be used. A polling scheme polling all possible requesters would not be very efficient, then. In such practical situations, according to the present invention, a more flexible polling scheme is used. Instead of applying a simple solution in which arbiter addresses are generated under control of a fixed counter, the address lines of the arbiter are connected to the data outputs of a Random Access Memory of which the address input lines are driven by a programmable counter. In this way the number of polled arbitration addresses can be matched exactly to the number of bus participants that are able to issue requests and/or certain bus participants can be favoured or prioritized in that their addresses more often appear on the arbitration address bus AA_bus per arbitration cycle. Also, the sequence of putting arbitration addresses onto the AA_bus can be chosen such that the bus is free of glitches that could occur in a random choice of addresses. Such glitches could cause bus participants not currently being addressed, to temporarily occupy an arbiter common request line, and thus slow down the arbitration process. E.g. an address sequence in accordance to a so-called Gray code can be chosen.

In the master arbitration phases mph, the current ARB_ ID, the ID of an active requester, is taken as a pointer to an assignement table (further to be described in relation to FIG. 6), which contains assignments between masters and slaves. The assignment table is initiated by the processor OCO, shown in FIG. 2, which also controls the arbiter circuit ARB. As shown in FIG. 6A, for a slave requester, a table entry of the assignment table is the ARB_ID of its master, and for a master requester the entry is the master's own ARB_ID. In FIG. 6A the master M1 is assigned to the slave S2 as well as to slave S1. The table entry, or target master ARB_ID, is the put onto the AA_bus and validated by a strobe signal, the/MA_ARB signal. The bus grant circuits BGC of the masters M1, M2, and M3 then compare the master's ARB_ ID on the arbitration address bus AA_bus with their own ARB_ID. If the IDs are identical for one BGC, this BGC generates an interrupt to its master. The master then has to activate a signal arbitration acknowledge, the signal/MA_ ACK, to inform the arbiter circuit ARB, that the master is ready to take over bus control. The timing of this signal is supervised by the arbiter ARB. If the master doesn't respond in time, the arbiter will at once return to the requester arbitration phase rph, and start a new arbitration cycle, such a situation being shown in FIG. 4C, the arbitration time-out situation. If the master responds in time, it will become the active bus master. In FIG. 4A and in FIG. 4B requester RQ C, i.e. master C, MA C, gets bus control, whereas in FIG. 4C master MAC doesn't respond in time, and thus doesn't get bus control. The period within which the master has to respond, an arbitration time-out period T_ARB, as shown in FIG. 4C, e.g. is 16 μsec.

In the data transfer phases dph, the active master has complete control over the data transfer bus T_bus. It may use the bus as long as it needs it, but no longer than an allocation time-out period T_ALL of, e.g., 1 msec. FIG. 4B shows a faulty bus master deactivating the/MA_ACK signal too late, i.e. beyond T_ALL. To recognize the source of the bus request, the master may read a register in the ARB circuit, to be described in FIG. 6, via the internal bus IPB, which register contains the ARB_ID of the requester which has initiated the arbitration. The latter is useful even if the master itself has requested the bus because at the same time a slave, which is assigned to that master might have issued a request. When the master has finished its tranfers, it releases the bus by deactivating the /MA_ACK signal, the bus then being idle again. The arbiter then returns to the requester arbitration phase rph and puts a next ARB_ID onto the AA_bus, indicated with RQ D.

In order to describe the data transfer mechanism on the transfer bus T_bus, FIG. 5 shows bus data transfer cycles in a processor bus architecture as described in FIG. 3. The data transfer bus T_bus is an asynchronous bus with handshaking capabilities, having an 8 bit wide data bus TD_bus, and a 13 bit wide address bus TA_bus. The four most significant address bus bits determine the physical location of the board (the so-called slot number) to be addressed, and 9 bits can be decoded on every board, i.e. an address space of 512 bytes is available per board. Although the data transfer bus is defined to be asynchronous, it is internally controlled by a clocked machine operating with a clock frequency of 16 MHz. Thus, one data transfer takes 500 nsec at minimum, or 8 clock cycles, the maximum bus bandwidth being 2 MBytes/sec. The data transfer bus has similarity with the MC68000 bus, but is modified for the purpose of the present invention.

Figure 5A:
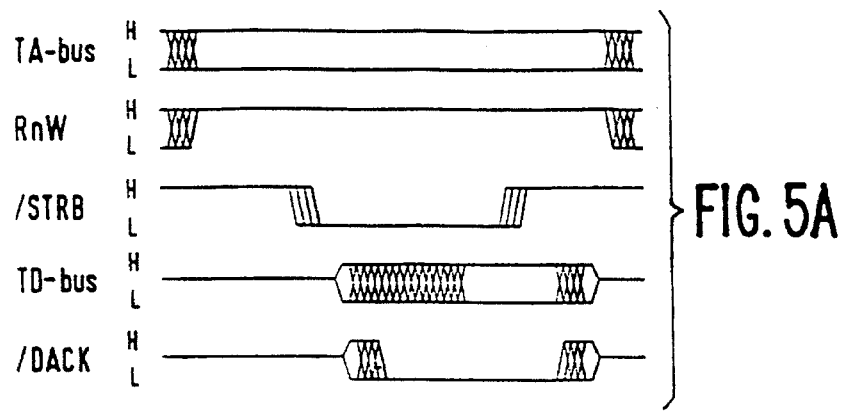
FIGS. 5A, 5B, 5C, and 5D show bus data transfer cycles in a processor bus architecture.
Figure 5B:
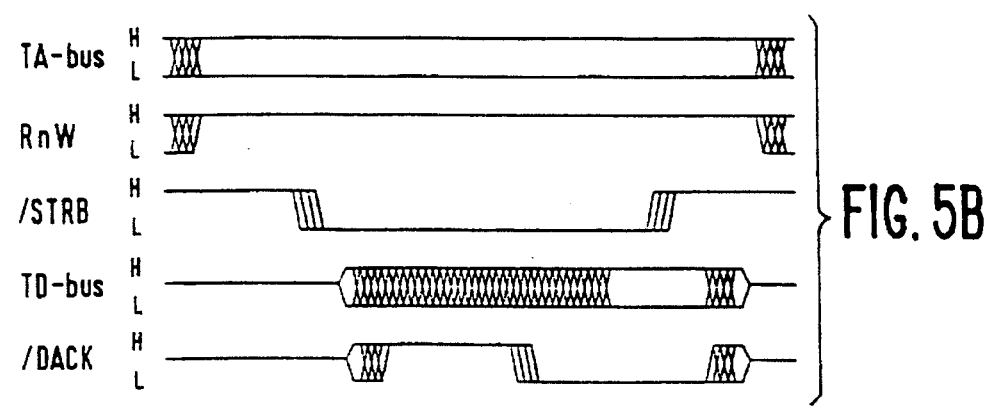
Figure 5C:
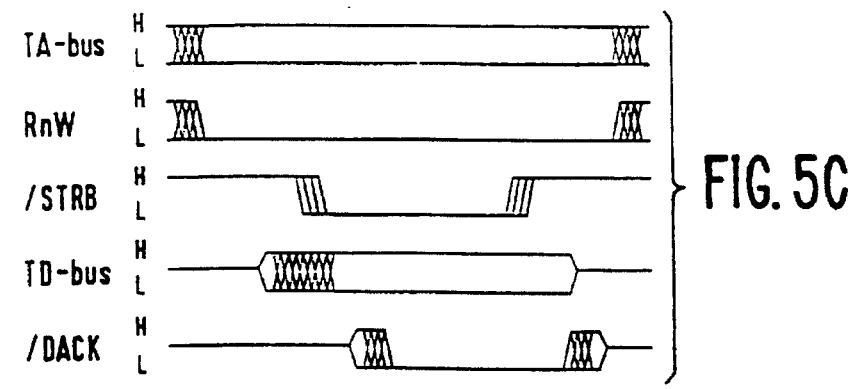
Figure 5D:
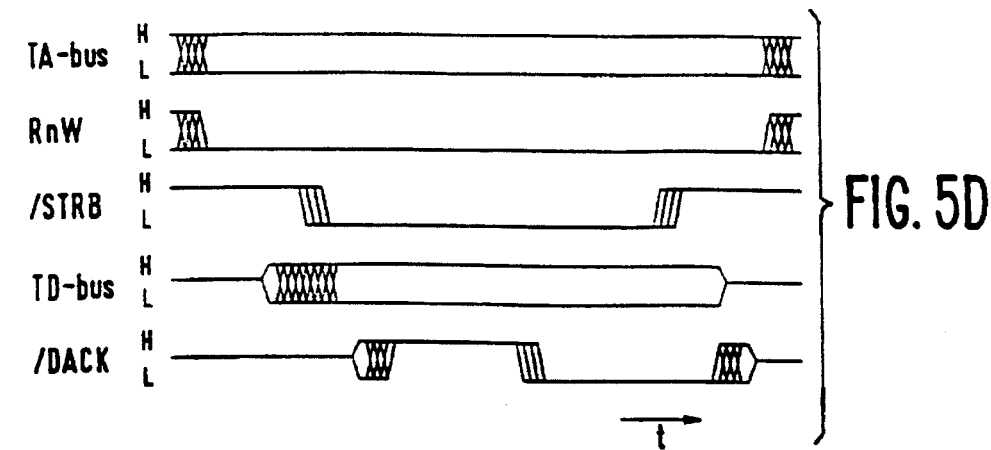

The data transfer bus T_bus is controlled by the active bus master, the bus being idle if there is no active master. The active master is defined by the address on the AA_bus and by the master arbitration signal/MA_ARB. The active master drives the address bus TA_bus, the control signals, and, during write cycles, the data bus TD_bus. Its bus drivers, not shown here, are enabled directly by a correct ARB_ID and an active /MA_ARB signal, except when the arbiter ARB is held in its reset state by its controlling processor, e.g. the processor OCO. In the latter case, the arbiter does not start any arbitration phases, and the OCO may use the bus. FIG. 5 shows various data transfer cycles, FIG. 5A showing a read cycle without wait, FIG. 5B showing a read cycle with wait, FIG. 5C showing a write cycle without wait, and FIG. 5D showing a write cycle with wait. The control bus TC_bus signals are a read/not write signal RnW, and a strobe signal /STRB, driven by the active master, and an acknowledge signal /DACK, driven by the addressed slave. The transfer address bus TA_bus is driven by the active master, and the transfer data bus TD_bus is either driven by the active master or by the addressed slave.

During read or write cycles the master M1, M2, or M3, puts data on the TD_bus in the presence of a RnW signal, and, with some delay, activates the strobe signal/ STRB. In case of a write cycle, it also drives the data lines. The slave circuitry RQC drives/DACK and, indicates to the master that a bus cycle can be finished and is used to insert wait states if data is not ready. A bus cycle will not terminate until /DACK is asserted, unless the master has a bus time-out supervision. After the master recognizes an asserted /DACK, it deasserts /STRB and, in case of a read cycle, samples the data. The slave then has to deassert /DACK. The bus cycle ends as the master changes the address and, in case of a write cycle, removes the data from the bus.

Figure 6:
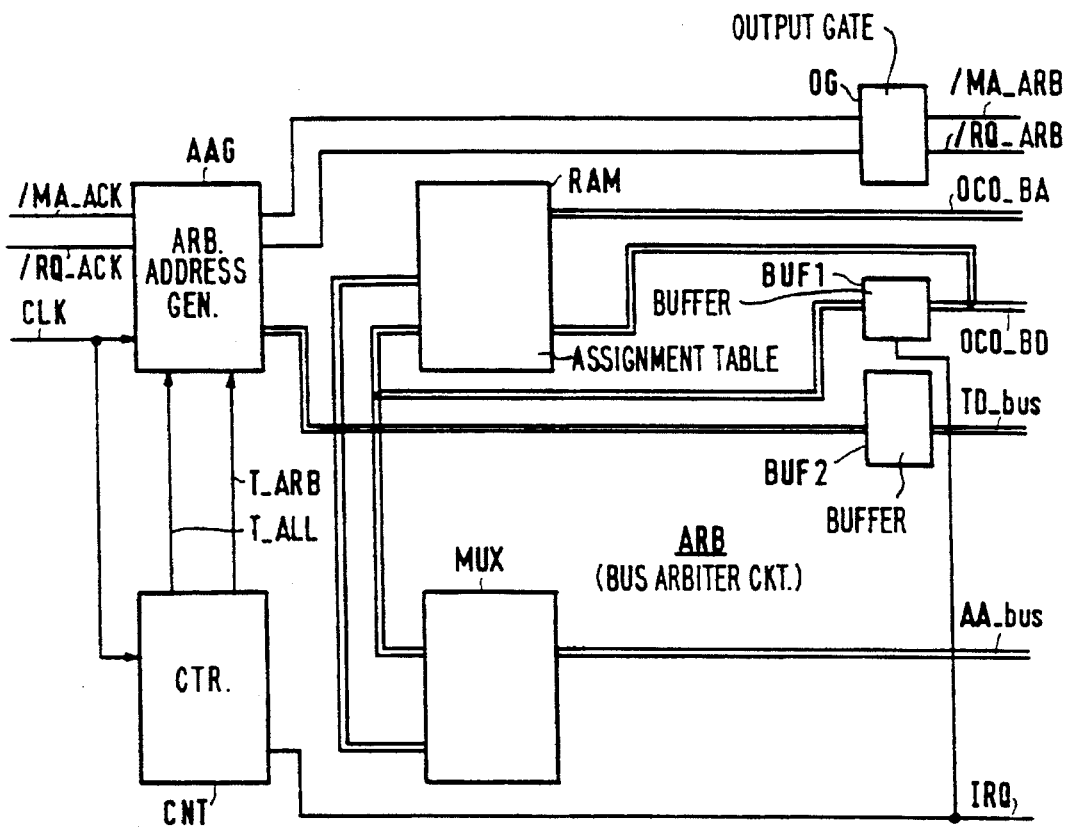
FIG. 6 is an embodiment of a bus arbiter circuit in a processor bus architecture, FIG. 6A showing the form of an assignment table which may be stored in said circuit.

FIG. 6 is an embodiment of a bus arbiter circuit ARB in a processor bus architecture according to the present invention comprising an arbitration address generator AAG for generating arbitration addresses on the basis of a number of input signals. The generator AAG is coupled to a counter circuit CNT for supplying the control signal T_ARB, which is the arbitration time-out signal, which is and T_ALL, the allocation time-out signal, to the generator AAG under clock control of an external clock CLK, e.g. 8 MHz. Further control signals for the generator AAG are/MA_ACK and/ RQ_ACK. The generator AAG generates the control signals/MA_ARB and/RQ_ARB, as have been described before, the signals/MA_ARB and/RQ_ARB being supplied to an output gate OG, which can be gated by an enable signal derived from a predetermined slot location (not shown). The ARB circuit further comprises a multiplexer MUX, controlled by the signal/RQ_ARB, for multiplexing addresses generated by the address generator AAG and addresses from a dual ported Random Access Memory RAM, i.e. switches between requester and master addresses, and further a buffer BUF1 for storing the arbitration IDs of faulty bus masters, i.e. bus masters exceeding the allocation time-out T_ALL, and a buffer BUF2 coupled to the transfer data bus TD_bus for supplying requester addresses. The counter CNT is staxted as soon as the signal /MA_ARB becomes active. The dual ported RAM stores the assignment table in which masters and slaves are assigned to each other, the assignment table being initialized by the processor OCO. To this end the dual ported RAM has an address bus OCO_BA and a data bus OCO_BD connected to the processor OCO, shown in FIG. 2. In case of an allocation time-out an interrupt IRQ is generated for the processor OCO, which can then access the buffer BUF1 for getting the address of the faulty bus master. For flexible polling the arbiter address lines are coupled to the data output lines of a RAM, of which the address input lines are driven by a programmable counter.

Figure 7:
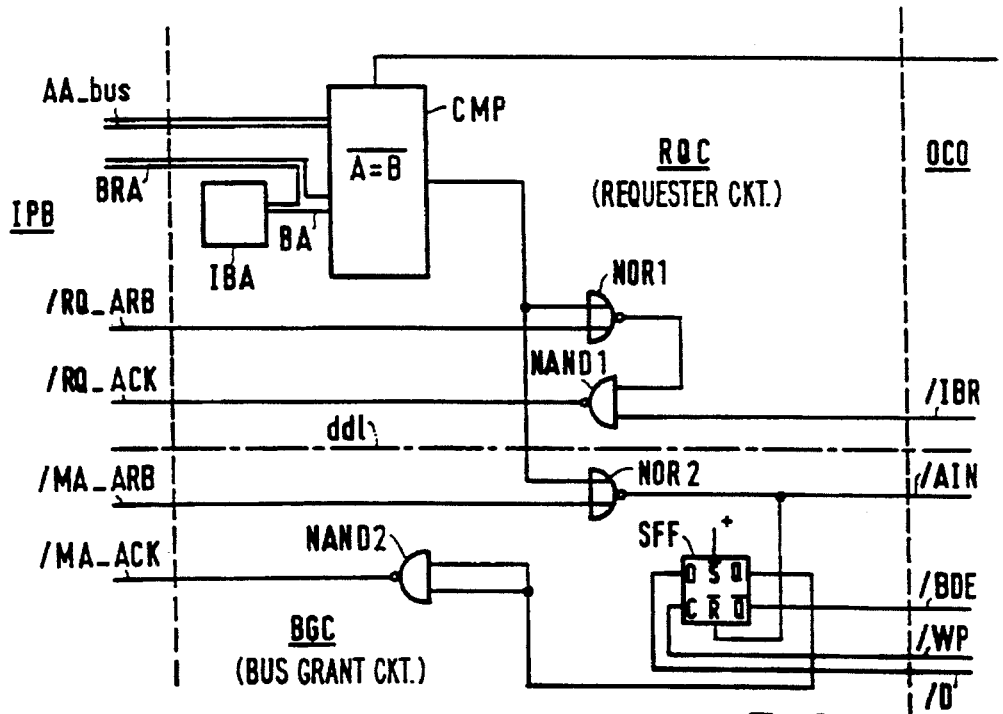
FIG. 7 is an embodiment of a requester and bus grant circuit in a processor bus architecture.

FIG. 7 is an embodiment of a requester circuit RQC and a bus grant circuit BGC in a processor bus architecture according to the present invention, above and below a dotted-dashed line ddl respectively. The requester circuit RQC comprises a comparator for comparing actual arbitration addresses on the arbitration address bus AA_bus with an address BA, containing an individual board address IBA and an on board requester address BRA. If the addresses match the acknowledge signal /RQ_ACK is driven low. If the signal /RQ_ARB is low, the arbiter is polling. The signals to the left of the left dashed vertical line are internal bus IPB signals, and the signals to the right of the right dashed vertical line are ARB controller signals. The latter signals comprise an internal bus request signal /IBR. The requester circuit RQC further comprises a NOR-gate NOR1, and a NAND-gate NAND1 for control signal purposes, as described.

The bus grant circuit BGC comprises an SR-flipflop SFF, a NOR-gate NOR2, and a NAND-gate NAND2. Input signals for the bus grant circuit are /MA_ARB at IPB side, and a write pulse /WP, a data bit signal /D at OCO side. Output signals are the /MA_ACK signal at IPB side, and the signals bus driver enable /BDE and acknowledge interrupt /AIN at OCO side. For the functioning of requester RQC and bus grant, see the description as given before.

We claim:

1. A base station transceiver for use in a cellular radio digital communication system which includes a plurality of mobile station transceivers and wherein communication with the mobile station transceivers is carried out by the base station transceiver over a plurality of time division multiplex frequency division channels; characterized in that said base station transceiver comprises:

a plurality of data processing units for coordinating and processing signal transmission in said channels, some of said data processing units being master units, others being slave units, and at least one being an arbitration unit;

an internal data bus to which all of said data processing units are coupled to provide for data transfer therebetween;

each master unit being operative to request access to said bus in order to initiate a data transfer cycle and to supply control signals to other master units and to slave units;

each slave unit being assigned to a master unit and being operative under control of the assigned master unit to request access to said bus for data transfer service when necessary to carry out a function ordered by the assigned master unit; and said arbitration unit being operative to arbitrate all pending requests for access to said bus by different requesting units by (i) examining all pending requests to determine the relative periods of pendency thereof; (ii) determining for each pending request a master unit associated therewith; and (iii) granting access to the master unit associated with a selected one of the pending requests;

wherein access to said bus by a requesting slave unit is only granted by way of a master unit to which the requesting slave unit is assigned.

2. A base station transceiver as claimed in claim 1, wherein said arbitration unit determines the periods of pendency of said requests by cyclic polling of the master units issuing said requests, treating a request by a slave unit as issued by the master unit assigned to said slave unit.

3. A base station transceiver as claimed in claim 2, wherein the cyclic polling is carried out in accordance with an adaptive priority algorithm.

4. A base station transceiver as claimed in claim 2, wherein each request for access to said bus includes a unique arbitration identification code for identifying the master unit issuing said request.

5. A base station transceiver as claimed in claim 4, wherein the arbitration identification code of a requesting master unit is at least partly based on a board address of a board on which said master unit is physically located, and the board address corresponds to a physical location thereof in a slot in a mounting frame of said system.

6. A base station transceiver as claimed in claim 1, wherein each request for access to said bus includes a unique arbitration identification code identifying the master unit issuing said request a request from a slave unit being treated as issued by a master unit assigned to said slave unit.

7. A base station transceiver as claimed in claim 6, wherein the arbitration identification code of a master unit is at least partly based on a board address of a board on which said master unit is physically located, and the board address corresponds to a physical location thereof in a slot in a mounting frame of said system.

8. A base station transceiver as claimed in claim 6, further comprising means for storing an assignment table in accordance with which certain master units are assigned for controlling other master units and/or slave units, and each arbitration identification code constitutes a pointer in said assignment table by which said arbitration unit determines how to proceed with arbitration of a request from a master unit for access to said bus.

9. A base station transceiver as claimed in claim 1, wherein a grant of access to said bus is only for a predetermined limited time interval.

10. A base station transceiver as claimed in claim 1, wherein said data bus comprises an arbitration bus and a data transfer bus in parallel.

* * * * *